United States Patent
Tanaka (10) Patent No.: US 12,177,562 B2
(45) Date of Patent: Dec. 24, 2024

(54) IMAGE-CAPTURING APPARATUS, CONTROL METHOD, AND STORAGE MEDIUM

(71) Applicant: CANON KABUSHIKI KAISHA, Tokyo (JP)

(72) Inventor: Tomonori Tanaka, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 79 days.

(21) Appl. No.: 18/302,836

(22) Filed: Apr. 19, 2023

(65) Prior Publication Data
US 2023/0370717 A1 Nov. 16, 2023

(30) Foreign Application Priority Data
May 13, 2022 (JP) .................. 2022-079710

(51) Int. Cl.
*H04N 23/661* (2023.01)
*H04N 5/265* (2006.01)
*H04N 23/695* (2023.01)

(52) U.S. Cl.
CPC .......... *H04N 23/661* (2023.01); *H04N 5/265* (2013.01); *H04N 23/695* (2023.01)

(58) Field of Classification Search
CPC ...... H04N 5/265; H04N 23/60; H04N 23/695; H04N 23/90; H04N 23/661
USPC .................................................... 348/211.2
See application file for complete search history.

(56) References Cited

U.S. PATENT DOCUMENTS

| | | | | |
|---|---|---|---|---|
| 6,606,127 B1 * | 8/2003 | Fang | ........................ | H04N 5/04 348/E5.014 |
| 7,808,529 B2 * | 10/2010 | Kaneko | ................ | H04N 5/2621 348/222.1 |
| 9,491,727 B2 * | 11/2016 | Webb, III | ......... | H04W 56/0035 |
| 11,012,674 B2 * | 5/2021 | Morisawa | ............ | H04N 13/239 |
| 11,212,432 B2 * | 12/2021 | Hara | ...................... | H04N 23/90 |
| 11,240,405 B2 * | 2/2022 | Mikawa | ................. | H04N 5/772 |
| 11,381,787 B2 * | 7/2022 | Nakatani | .............. | H04N 23/634 |
| 11,496,683 B2 * | 11/2022 | Ito | .......................... | H04N 23/63 |
| 2005/0046701 A1 * | 3/2005 | Kaneko | ................ | H04N 5/2621 348/222.1 |

(Continued)

FOREIGN PATENT DOCUMENTS

JP 2016-142785 A 8/2016

*Primary Examiner* — Pritham D Prabhakher
(74) *Attorney, Agent, or Firm* — Carter, DeLuca & Farrell LLP (57) ABSTRACT

An image-capturing apparatus is provided. The image-capturing apparatus has an imaging sensor, a controller, and a communication interface. The controller controls operation timings of the image-capturing apparatus. The communication interface outputs an image captured by the imaging sensor and control information of the imaging sensor to the outside at timings controlled by the controller. The controller can control the operation timings of the image-capturing apparatus in accordance with a synchronization signal input to the image-capturing apparatus. The controller synchronizes the synchronization signal and the operation timings of the image-capturing apparatus before the control information is output to the outside, when an instruction to output the control information to the outside is input while the synchronization signal and the operation timings are not synchronized.

16 Claims, 4 Drawing Sheets

(56) References Cited

U.S. PATENT DOCUMENTS

| | | | | |
|---|---|---|---|---|
| 2012/0044001 A1* | 2/2012 | Tanaka | .................... | H03L 7/235 |
| | | | | 327/156 |
| 2014/0348248 A1* | 11/2014 | Ihara | ................. | H04N 21/4305 |
| | | | | 375/240.26 |
| 2015/0071308 A1* | 3/2015 | Webb, III | ......... | H04W 56/0035 |
| | | | | 370/503 |
| 2018/0160042 A1* | 6/2018 | He | ....................... | H04N 13/156 |
| 2019/0082160 A1* | 3/2019 | Yano | .................... | G06T 15/205 |
| 2019/0208130 A1* | 7/2019 | Hara | ..................... | H04N 23/90 |
| 2019/0333541 A1* | 10/2019 | Mack | ..................... | G11B 27/10 |
| 2020/0322591 A1* | 10/2020 | Yano | .................... | H04N 13/239 |
| 2020/0336719 A1* | 10/2020 | Morisawa | ............ | H04N 13/239 |
| 2020/0382680 A1* | 12/2020 | Mikawa | .............. | H04N 9/8042 |
| 2021/0281755 A1* | 9/2021 | Ito | ........................... | H04N 23/63 |
| 2021/0281805 A1* | 9/2021 | Nakatani | ................. | H04N 5/04 |
| 2022/0070336 A1* | 3/2022 | Tanaka | .................... | H04N 5/04 |
| 2023/0098499 A1 | 3/2023 | Tanaka | | |

\* cited by examiner

FIG. 1

IMAGE-CAPTURING APPARATUS, CONTROL METHOD, AND STORAGE MEDIUM

BACKGROUND OF THE INVENTION

Field of the Invention

The present invention relates to an image-capturing apparatus, a control method, and a storage medium, and particularly relates to virtual studio technology.

Description of the Related Art

In recent years, virtual studio technology has been realized in which a live video and a virtual space (CG) are combined using protocol processing (FreeD protocol) for outputting position and orientation information of an image-capturing apparatus in real time. The Genlock function, which is a function for driving an image-capturing apparatus in accordance with a synchronization signal input from the outside, is also known. Furthermore, by applying the Genlock function when the FreeD protocol processing is applied, position and orientation information of an image-capturing apparatus can be output in accordance with a synchronization signal input from the outside. On the other hand, Japanese Patent Laid-Open No. 2016-142785 discloses a technique in which black images are output while Genlock is unstable after the Genlock function has been activated.

SUMMARY OF THE INVENTION

According to an embodiment of the present invention, an image-capturing apparatus comprises: an imaging sensor; a controller configured to control operation timings of the image-capturing apparatus; and a communication interface configured to output an image captured by the imaging sensor and control information of the imaging sensor to the outside at timings controlled by the controller, wherein the controller can control the operation timings of the image-capturing apparatus in accordance with a synchronization signal input to the image-capturing apparatus, and the controller synchronizes the synchronization signal and the operation timings of the image-capturing apparatus before the control information is output to the outside, when an instruction to output the control information to the outside is input while the synchronization signal and the operation timings are not synchronized.

According to another embodiment of the present invention, a control method performed by an image-capturing apparatus comprising an imaging sensor and a controller configured to control operation timings of the image-capturing apparatus, wherein the controller can control the operation timings of the image-capturing apparatus in accordance with a synchronization signal input to the image-capturing apparatus comprises: synchronizing the synchronization signal and the operation timings of the image-capturing apparatus before control information of the imaging sensor is output to the outside, when an instruction to output the control information to the outside is input while the synchronization signal and the operation timings are not synchronized; and outputting an image captured by the imaging sensor and the control information of the imaging sensor to the outside at timings controlled by the controller.

According to still another embodiment of the present invention, a non-transitory computer-readable medium stores a program executable by one or more processors of an image capturing apparatus comprising an imaging sensor to perform a method comprising: controlling operation timings of the image-capturing apparatus; synchronizing a synchronization signal input to the image-capturing apparatus and the operation timings of the image-capturing apparatus before control information of the imaging sensor is output to the outside, when an instruction to output the control information to the outside is input while the synchronization signal and the operation timings are not synchronized; controlling the operation timings of the image-capturing apparatus in accordance with the synchronization signal; and outputting an image captured by the imaging sensor and the control information of the imaging sensor to the outside at the controlled operation timings.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In virtual studio technology, images are synthesized based on control information such as position and orientation information of an image-capturing apparatus, but the output of the control information of the image-capturing apparatus is disturbed if synchronization of operations of the image-capturing apparatus and a synchronization signal is started while the control information is being output. There is no difference even if the method disclosed in Japanese Patent Laid-Open No. 2016-142785 is adopted; virtual studio technology-based image synthesis processing will be disturbed anyway.

One embodiment of the present invention can suppress image synthesis processing performed based on control information of an image-capturing apparatus using an image captured by the image-capturing apparatus from being disturbed.

Figure 1:
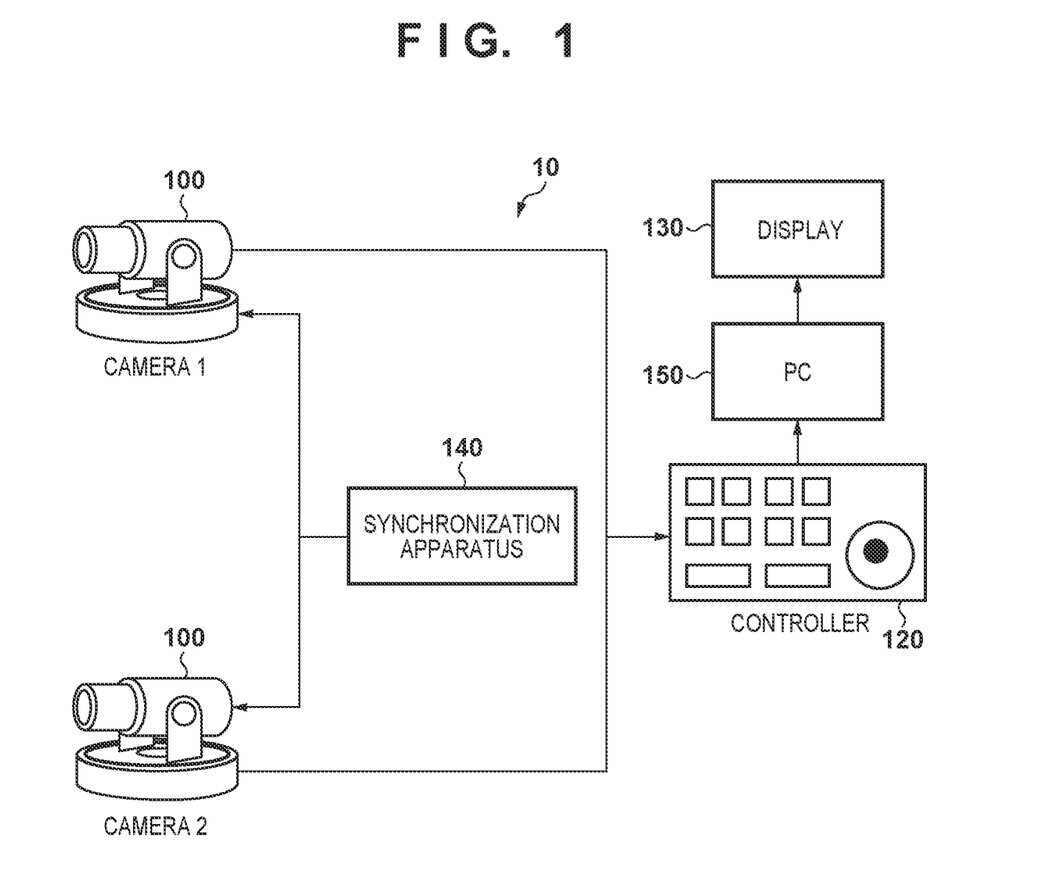
FIG. 1 is a diagram illustrating an example configuration of an image-capturing system pertaining to one embodiment.

In the following, one embodiment of the present invention will be described with reference to the attached drawings. FIG. 1 illustrates an example configuration of an image-capturing system pertaining to the present embodiment. An image-capturing system 10 pertaining to the present embodiment includes a plurality of cameras 100, a controller 120, a display 130, a synchronization apparatus 140, and a PC 150. In this image-capturing system, images output from the two cameras 100 (camera 1 and camera 2) are displayed on the display 130, and the image displayed on the display 130 is switched by the controller 120. Furthermore, a synchronization signal output from the synchronization apparatus 140 is input to the cameras 1 and 2, and images are output from the cameras 1 and 2 in synchronization with the input synchronization signal. For example, the cameras 100 can output videos constituted from a plurality of frame images, and in this case, the cameras 100 can output frame images in synchronization. According to such a configuration, images output from the cameras 1 and 2 are synchronized. Thus, the occurrence of image interruption when the controller 120 switches the image displayed on the display 130 from the image from the camera 2 to the image from the camera 1 can be avoided. In the present specification, the term "image" includes video.

While a case in which switching is performed between images from two cameras 100 will be described in the following, the image-capturing system pertaining to one embodiment may include three or more cameras 100. In this case, images output from the three or more cameras 100 can be synchronized, and the controller 120 can switch between the images from the three or more cameras 100.

Furthermore, each camera 100 outputs an image and control information of the camera 100 to the controller 120. The controller 120 outputs, to the PC 150, the image and the control information acquired from the camera 100. The PC 150 can perform image processing on the image output from the camera 100 and output the obtained image to the display 130. For example, the PC 150 can generate a synthesized image by synthesizing the image output from the camera 100 and a virtual space (CG), and output the synthesized image to the display 130. Here, the PC 150 may perform image synthesis based on control information of the camera 100. For example, the PC 150 can superimpose the image output from the camera 100 onto a position in the virtual space that corresponds to the position or orientation of the camera 100, or onto a position in the virtual space that corresponds to the focus distance of the camera 100. The PC 150 may include a virtual studio application that performs such processing. Any information processing apparatus or computer, such as a server, that can process images output from the controller 120 may be used in place of the PC 150.

Figure 2A:
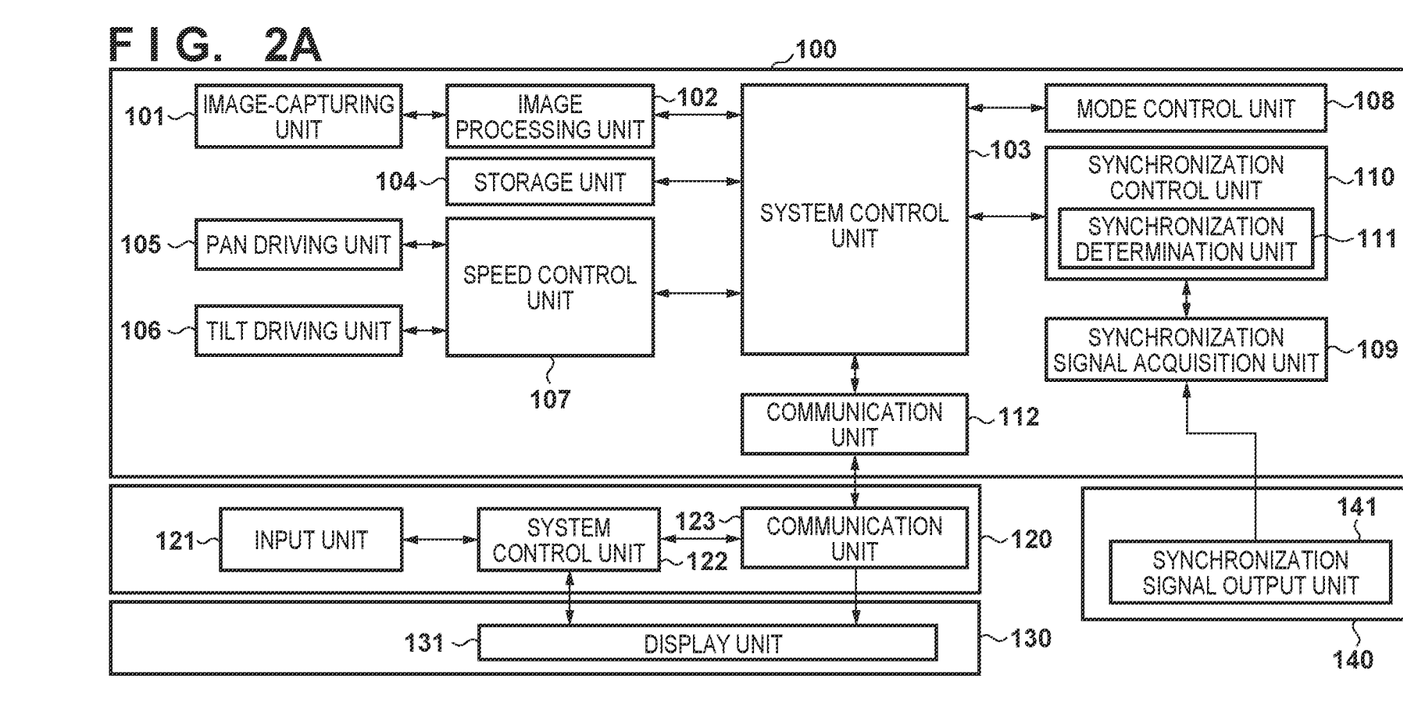
FIGS. 2A and 2B are diagrams illustrating an example configuration of an image-capturing apparatus pertaining to one embodiment.

Next, functional configurations of the apparatuses included in the image-capturing system 10 will be described with reference to FIG. 2A. FIG. 2A illustrates an example of functional configurations of the apparatuses included in the image-capturing system 10 pertaining to the present embodiment.

Each camera 100, which is an image-capturing apparatus pertaining to one embodiment of the present invention, has the function of capturing an image. For example, the camera 100 may be a remote camera or a network camera, and can capture an image of a subject present in a monitoring-target area. The camera 100 pertaining to the present embodiment includes an image-capturing unit 101, an image processing unit 102, a system control unit 103, a storage unit 104, a pan driving unit 105, a tilt driving unit 106, a speed control unit 107, and a mode control unit 108. The camera 100 pertaining to the present embodiment further includes a synchronization signal acquisition unit 109, a synchronization control unit 110, a synchronization determination unit 111, and a communication unit 112. In the following, each constituent element will be described.

The image-capturing unit 101 captures an image. The image-capturing unit 101 includes an optical system such as lenses, and an image sensor such as a CMOS image sensor, and captures an image of a subject present in the monitoring-target area and generates an analog image signal representing the image. Furthermore, the image-capturing unit 101 converts the obtained analog image signal into a digital image signal, and outputs the digital image signal to the image processing unit 102.

The image processing unit 102 generates image data based on the digital image signal output from the image-capturing unit 101. For example, in order to generate image data, the image processing unit 102 can perform compression coding processing and predetermined image processing including development processing, such as debayer processing, white balance processing, and tone conversion processing. The image processing unit 102 outputs the obtained image data to the system control unit 103.

The system control unit 103 controls the overall operation of the camera 100. For example, the system control unit 103 can output, to the controller 120 via the communication unit 112, the image data acquired from the image processing unit 102, which has been generated as a result of the image capturing by the image-capturing unit 101 and the processing by the image processing unit 102. Furthermore, the system control unit 103 can receive a control command from the controller 120 via the communication unit 112, and perform processing corresponding to the command by analyzing the received command. For example, upon receiving a command for configuring image-quality adjustment, the system control unit 103 can control the image processing unit 102 so as to perform image-data generation processing using parameters that are in accordance with the command. Furthermore, upon receiving a command for panning or tilting the image-capturing unit 101, the system control unit 103 can control the pan driving unit 105 or the tilt driving unit 106 so that panning or tilting in accordance with the command is performed.

Furthermore, the system control unit 103 can receive a command for activating or deactivating control of operation timings in accordance with a synchronization signal. In the present embodiment, upon receiving such a command, the system control unit 103 controls the synchronization control unit 110 so that control of operation timings in accordance with a synchronization signal is activated or deactivated. The technique of controlling operation timings in accordance with a synchronization signal input from the outside, or more specifically, the technique of synchronizing operation timings and a synchronization signal input from the outside is generally referred to as Genlock.

Furthermore, the system control unit 103 can output control information of the camera 100 to the controller 120 via the communication unit 112. For example, control information of the camera 100 can include position information and orientation information of the camera 100. As a specific example, the pan driving unit 105 and the tilt driving unit 106 can control the pan angle and the tilt angle of the camera 100 in accordance with pan angle information and tilt angle information. In this case, the orientation information of the camera 100 can include the pan angle information and the tilt angle information. Furthermore, the position information of the camera 100 can be acquired using a technique for estimating position based on a captured image, a technique for measuring position using electromagnetic waves, or the like. In addition, control information of the camera 100 can include an image-capturing parameter of the camera 100. For example, the image-capturing parameter may be lens control information such as a focus distance or an aperture value, and the image-capturing unit 101 can control the optical system in accordance with such lens control information upon capturing an image. In the present embodiment, the system control unit 103 outputs control information of the camera 100 in accordance with the FreeD protocol. For example, the system control unit 103 can output such control information to the controller 120 by means of FreeD protocol processing.

By executing the FreeD protocol processing after Genlock is activated, the system control unit 103 can output control information at timings that are synchronized with a synchronization signal input from the outside. For example, by outputting control information at rise timings of the synchronization signal, the system control unit 103 can output control information at a constant timing.

The storage unit 104 can store control data to be used to control the camera 100, and image data obtained by the image-capturing unit 101 and the image processing unit 102. Note that, in a playback mode, the image data stored in the storage unit 104 is output to a display unit 131. Furthermore, image-adjustment parameters, network setting values, or the orientation information (i.e., image-capturing direction information) of the camera 100 can be stored in advance in the storage unit 104. For example, image-capturing direction information may be the pan angle and the tilt angle of the image-capturing unit 101 having being controlled by the pan driving unit 105 and the tilt driving unit 106. Due to the storage unit 104 storing such information, the system control unit 103 can acquire previously set information from the storage unit 104 when the camera 100 is reactivated.

The pan driving unit 105, the tilt driving unit 106, and the speed control unit 107 are direction control mechanisms for controlling the image-capturing direction of the camera 100. The pan driving unit 105 includes a mechanical driving system that pans the image-capturing unit 101 in accordance with a control instruction from the system control unit 103, and a motor that is the pan drive source, and the mechanical driving system drives the image-capturing unit 101 in the pan direction as a result of the motor being driven. The tilt driving unit 106 includes a mechanical driving system that tilts the image-capturing unit 101 in accordance with the control instruction from the system control unit 103, and a motor that is the tilt drive source, and the mechanical driving system drives the image-capturing unit 101 in the tilt direction as a result of the motor being driven. In accordance with the control instruction from the system control unit 103, the speed control unit 107 calculates drive speeds to be included in the next instruction based on the current speed, target speed, and acceleration of the image-capturing unit 101, or information included in an acceleration/deceleration table. Furthermore, the speed control unit 107 provides the pan driving unit 105 and the tilt driving unit 106 with instructions to drive at the calculated speeds.

The mode control unit 108 performs mode switching control for switching the operation mode of the camera 100. The operation mode of the camera 100 in the present embodiment is a normal image-capturing mode (first operation mode), a standby mode (second operation mode), or a playback mode (third operation mode). The mode control unit 108 can switch the operation mode of the camera 100 in accordance with instructions from the controller 120 acquired via the communication unit 112 and the system control unit 103. For example, the mode control unit 108 can determine whether or not a switching instruction (transition instruction) to switch to the standby mode or the normal image-capturing mode has been input, and set the operation mode of the camera 100 based on the determination. For example, the current operation mode can be indicated by a setting value such as 0, 1, or 2. For example, the values 0, 1, and 2 can respectively indicate the standby mode, the normal image-capturing mode, and the playback mode. Note that, while the mode control unit 108 is illustrated in FIG. 2A as a processing unit separate from the system control unit 103, the mode control unit 108 may be configured as part of the system control unit 103.

Furthermore, the mode control unit 108 can perform control for switching the drive frequency at which the camera 100 operates. For example, the drive frequency of the camera 100 may be switchable between 59.94 Hz and 29.97 Hz. The current drive frequency can be indicated by a setting value such as 10 or 11. For example, the values 10 and 11 can respectively indicate 59.94 Hz and 29.97 Hz.

The system control unit 103 can determine the operation mode set by the mode control unit 108 and control the camera 100 in accordance with the operation mode. For example, in the normal image-capturing mode, which is the first operation mode, the system control unit 103 outputs image data to the controller 120 using the following processing units: the image-capturing unit 101; the image processing unit 102; the system control unit 103; and the communication unit 112. In addition, the system control unit 103 can control the panning and tilting of the image-capturing unit 101 via the pan driving unit 105, the tilt driving unit 106, and the speed control unit 107. Furthermore, the system control unit 103 stores the image data generated by the image processing unit 102 in the storage unit 104 via the system control unit 103.

On the other hand, in the standby mode, which is the second operation mode, the system control unit 103 stops the output of image data to the controller 120. Furthermore, the system control unit 103 stops the panning and tilting by the pan driving unit 105, the tilt driving unit 106, and the speed control unit 107.

In the playback mode, which is the third operation mode, the system control unit 103 outputs image data stored in the storage unit 104 to the controller 120 via the system control unit 103 and the communication unit 112. Note that, if a plurality of pieces of image data are stored in the storage unit 104, the system control unit 103 can output, to the controller 120, a piece of image data specified by a user via the controller 120.

Furthermore, the system control unit 103 can determine whether or not an incorrect synchronization signal has been input to the camera 100. For example, the system control unit 103 can determine whether or not an incorrect synchronization signal has been input by comparing the frequencies of a synchronization signal input to the synchronization signal acquisition unit 109 and a synchronization signal generated by the synchronization control unit 110. Specifically, the system control unit 103 can determine whether or not the drive frequency of the camera 100 and the frequency of a second synchronization signal input from the synchronization signal acquisition unit 109 match. The system control unit 103 can determine that a correct synchronization signal has been input if these frequencies match, and determine that an incorrect synchronization signal has been input if these frequencies do not match. If it is determined that an incorrect synchronization signal has been input, the system control unit 103 can provide to the outside a notification that an incorrect synchronization signal has been input. For example, the system control unit 103 can output, to the controller 120 via the system control unit 103 and the communication unit 112, image data that is stored in the storage unit 104 and that indicates that an incorrect synchronization signal has been input. Furthermore, the system control unit 103 may similarly output, to the controller 120, image data urging the input of a synchronization signal having the correct frequency.

The synchronization signal acquisition unit 109 acquires a synchronization signal from the outside. In the present embodiment, the synchronization signal output from the synchronization apparatus 140 is input to the camera 100 via the synchronization signal acquisition unit 109.

The synchronization control unit 110 can generate a first synchronization signal. The system control unit 103 and the entire camera 100 can operate in synchronization in accordance with the first synchronization signal. In such a manner, the synchronization control unit 110 can control operation timings of the camera 100 and synchronize the units of the camera 100. For example, the system control unit 103 can output images captured by the image-capturing unit 101 and control information of the camera 100 to the outside at timings controlled by the synchronization control unit 110.

Furthermore, the synchronization control unit 110 can control operation timings of the camera 100 in accordance with a synchronization signal input to the camera 100. For example, the synchronization control unit 110 can synchronize the first synchronization signal with the second synchronization signal input from the synchronization signal acquisition unit 109. Thus, the synchronization control unit 110 can perform control for synchronizing the second synchronization signal and operations of the camera 100. In this case, in the normal image-capturing mode, the system control unit 103 can output images to the controller 120 at timings synchronized with the second synchronization signal.

In the present embodiment, the synchronization control unit 110 can activate or deactivate control of operation timings in accordance with a synchronization signal. For example, the synchronization control unit 110 can perform control for switching between activation and deactivation of Genlock. The activation of Genlock means that synchronization with the second synchronization signal is started from a state in which the second synchronization signal is being input from the synchronization signal acquisition unit 109 with a Genlock activation instruction from the controller 120 as a trigger. On the other hand, the deactivation of Genlock means that the synchronization with the second synchronization signal is stopped with a Genlock deactivation instruction from the controller 120 as a trigger. In this case, operations of the camera 100 are controlled regardless of the second synchronization signal, using only the first synchronization signal generated by the synchronization control unit 110. Publicly known methods can be used in regard to the Genlock technique, and detailed description thereof will thus be omitted. Furthermore, the synchronization control unit 110 can acquire the frequency of the second synchronization signal input from the synchronization signal acquisition unit 109 (e.g., the frequency of a V synchronization signal).

The synchronization determination unit 111 determines whether or not the first and second synchronization signals are stably synchronized, i.e., whether or not Genlock is stable. For example, the synchronization determination unit 111 can acquire the difference between an WV synchronization signal (first synchronization signal) generated by the synchronization control unit 110 and an WV synchronization signal (second synchronization signal) input to the synchronization signal acquisition unit 109. Furthermore, the synchronization determination unit 111 can determine that the two synchronization signals are stably synchronized if this difference remains within a predetermined number of clocks for a predetermined period or longer, and otherwise determine that the two synchronization signals are not stably synchronized.

Furthermore, once the synchronization control unit 110 activates Genlock and starts the synchronization, it takes approximately several seconds for the first synchronization signal to stably synchronize with the second synchronization signal input to the synchronization signal acquisition unit 109. Thus, the synchronization is unstable for approximately several seconds (e.g., 7 seconds) after Genlock is activated. Thus, as another method for determining whether or not the first and second synchronization signals are stably synchronized, the synchronization determination unit 111 may determine whether or not a predetermined amount of time (e.g., 7 seconds as mentioned above) has elapsed from when Genlock was activated and the synchronization was started. Note that, during the Genlock stabilization process, the image output by the camera 100 may be disturbed, or image processing may be interrupted due to the synchronization processing.

The communication unit 112 communicates with external devices such as the controller 120. For example, the communication unit 112 can perform processing for network communication via a LAN.

The controller 120 switches the image displayed on the display 130. The controller 120 can operate as a switching device, a switcher, or a display control apparatus. The controller 120 includes an input unit 121, a system control unit 122, and a communication unit 123. The input unit 121 is constituted from buttons, a joystick, or the like, and can accept input or various operations from the user. For example, the user can perform, via the input unit 121, an operation for switching the camera 100 that outputs an image, an operation for switching between operation modes (e.g., the standby mode and the normal image-capturing mode) of the cameras 100, an operation for activating or deactivating Genlock, etc. The system control unit 122 transmits, to the cameras 100 via the communication unit 123, control commands corresponding to operations accepted from the user via the input unit 121. The communication unit 123 can communicate with the cameras 100, and can perform processing for network communication via a LAN, for example.

The display 130 includes the display unit 131. The display 130 can receive image data output from the cameras 100 via the controller 120, and display the image data on the display unit 131. For example, the display unit 131 is a display device such as a liquid-crystal display.

The synchronization apparatus 140 includes a synchronization signal output unit 141. The synchronization signal output unit 141 outputs a synchronization signal (corresponding to the above-described second synchronization signal) that is used as a reference signal for causing the plurality of cameras 100 to operate in synchronization. In the present embodiment, the synchronization signal from the synchronization apparatus 140 is input to the synchronization signal acquisition unit 109 of each camera 100.

Figure 2B:
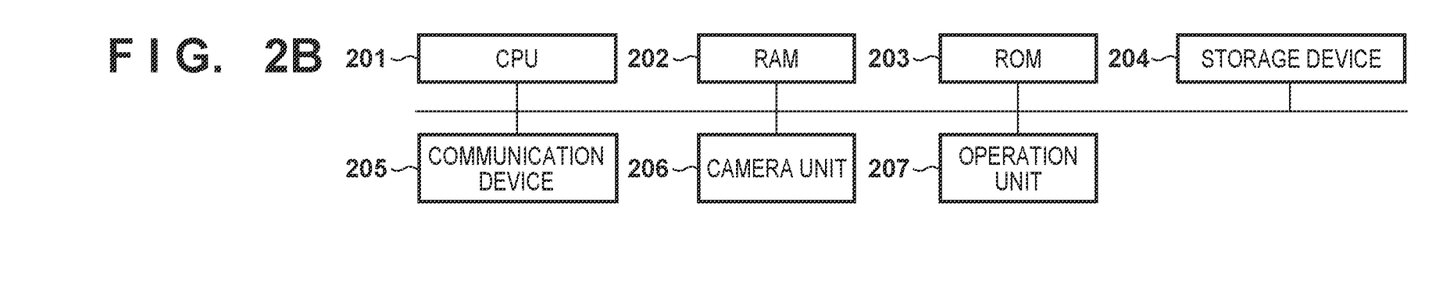

Next, an example of a hardware configuration of each camera 100 will be described with reference to FIG. 2B. A CPU 201 can perform overall control of the camera 100, and calculation, processing, and management of data.

A RAM 202 is a volatile memory, and is used as a main memory for the CPU 201 or as a temporary storage area such as a work area for the CPU 201. A ROM 203 is a nonvolatile memory, and stores image data or other types of data, various programs used by the CPU 201 for operation, etc., in predetermined areas corresponding thereto.

A storage device 204 is an SD card or a magnetic disk such as a HDD, a flash memory, or the like, for example, and can function as the storage unit 104. The storage device 204 can store application programs, an OS, control programs, related programs, etc. Reading of data from the storage device 204 and writing of data to the storage device 204 can be performed based on control by the CPU 201. The storage device 204 may be used in place of the RAM 202 or the ROM 203.

In such a manner, the functions of the units illustrated in FIG. 2A can be realized by a processor such as the CPU 201 executing one or more programs stored in a memory such as the RAM 202, the ROM 203, or the storage device 204. For example, the CPU 201 can control the units of the camera 100 in accordance with the programs stored in the ROM 203 by using the RAM 202 as a work memory. For example, the CPU 201 can function as the system control unit 103, the speed control unit 107, the mode control unit 108, the synchronization control unit 110, and the like. Furthermore, the CPU 201 may also function as the image processing unit 102, which generates image data by compressing and encoding a digital image signal output from a camera unit 206. Note that the programs allowing the CPU 201 to operate may be stored in the storage device 204 instead of the ROM 203.

While the functions of the image-capturing apparatus pertaining to one embodiment of the present invention can be realized by a computer including a processor and a memory as described above, some or all of the functions of the image-capturing apparatus may be realized by dedicated hardware. Furthermore, the image-capturing apparatus pertaining to one embodiment of the present invention may be constituted from a plurality of devices that are connected to one another via a network, for example.

A communication device 205 is a communication interface for communicating with the controller 120, and can function as the communication unit 112. The communication device 205 can operate in accordance with control by the CPU 201. The communication device 205 can include a wireless communication module. This module can include circuitry such as an antenna system, an RF transceiver, one or more amplifiers, a tuner, one or more oscillators, a digital signal processor, a CODEC chipset, a subscriber identity module card, and a memory. Furthermore, the communication device 205 can also include a wired-communication module for wired communication. The wired-communication module enables communication with other devices via one or more external ports. These external ports can be directly connected to or indirectly connected, via a network, to other devices via Ethernet, USB, IEEE 1394, or the like. The communication device 205 can further include various software components that process data. Note that, while the communication device 205 is illustrated as hardware in FIG. 2B, the camera 100 may include software realizing similar functions as an alternative to such hardware.

The camera unit 206 includes an image-capturing optical system, an image sensor such as a CCD or CMOS image sensor, a developing processing unit, etc., and can function as the image-capturing unit 101. The camera unit 206 can generate an image by capturing an image of a predetermined region within the monitoring-target area in a real space. Furthermore, the camera unit 206 can convert an analog image signal obtained as a result of photoelectric conversion being performed in the image sensor into a digital image signal by A/D conversion, and output the digital image signal to the CPU 201. The camera unit 206 can acquire a still image or a moving image. For example, the camera unit 206 can acquire a 30 fps-moving image (live video) of the monitored region by acquiring an image consisting of a predetermined number of frame images (e.g., 30 frames) per second. The camera unit 206 also includes a movable platform or the like for controlling the image-capturing direction and angle of view of the image-capturing optical system, and can function as the pan driving unit 105 and the tilt driving unit 106.

An operation unit 207 can accept input of operations from the user. For example, the operation unit 207 may be buttons, a D-pad, a touch panel, or the like.

Furthermore, the functions of the controller 120 can also be realized by a processor executing one or more program stored in a memory. For example, the controller 120 can also have a hardware configuration similar to that illustrated in FIG. 2B. In this case, the camera unit 206 is unnecessary. The operation unit 207 can function as the input unit 121, and the operation unit 207 can further include a keyboard or a mouse.

Figure 3:
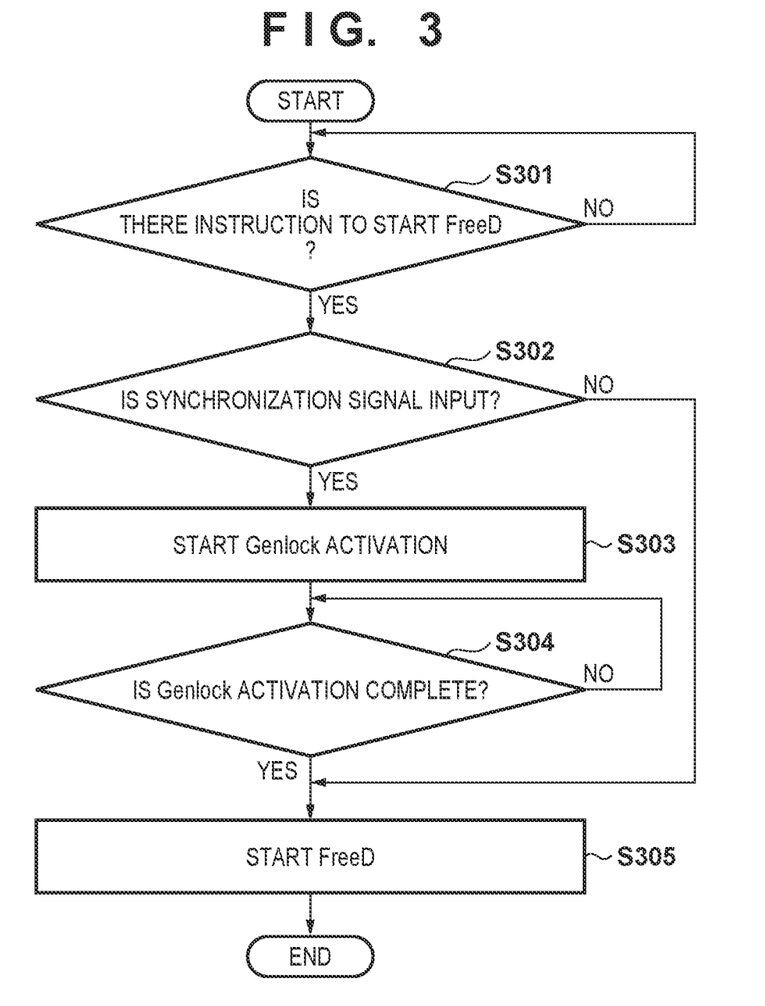
FIG. 3 is a flowchart of a control method executed by the image-capturing apparatus pertaining to one embodiment.

Next, a flow of a control method executed by the image-capturing apparatus pertaining to the present embodiment will be described with reference to the flowchart illustrated in FIG. 3. Each process illustrated in the flowchart in FIG. 3 can be realized by the CPU 201 controlling the entire camera 100 by executing a corresponding program stored in the ROM 203, the storage device 204, or the like. Here, the CPU 201 can function as the system control unit 103, the mode control unit 108, and the synchronization control unit 110. The processing according to the flowchart illustrated in FIG. 3 may be started in response to an instruction from the user, or may be started automatically by the camera 100 after the camera 100 is activated. Otherwise, after the camera 100 is activated, the camera 100 may automatically determine whether or not the processing is to be started.

In the following example, the camera 100, the controller 120, the display 130, and the synchronization apparatus 140 are already activated, and the controller 120 is capable of accepting input operations from the user. Furthermore, before the processing according to the flowchart illustrated in FIG. 3 is started, operation in the normal image-capturing mode is started as a result of the system control unit 103 controlling the units of the camera 100. In the following example, before the flowchart illustrated in FIG. 3 is started, the synchronization signal from the synchronization apparatus 140 and operation timings of the image-capturing apparatus are not synchronized, or in other words, Genlock is deactivated.

In step S301, the system control unit 103 determines whether or not an instruction to output control information to the outside has been input from the controller 120. In the present embodiment, the system control unit 103 determines whether or not an instruction to start the FreeD protocol processing has been accepted from the controller 120. If it is determined that an instruction to start the FreeD protocol processing has been accepted, processing advances to step S302. If it is not determined that an instruction to start the FreeD protocol processing has been accepted, the processing in step S301 is repeated.

In step S302, the synchronization signal acquisition unit 109 determines whether or not the synchronization signal is being input from the synchronization apparatus 140. If it is determined that the synchronization signal is being input, processing advances to step S303. If it is determined that the synchronization signal is not being input, processing advances to step S305.

In step S303, the synchronization control unit 110 starts to synchronize the synchronization signal and operation timings. The processing in step S303 is performed if an instruction to output control information to the outside is input when the synchronization signal is being input to the camera 100, and the synchronization signal and operation timings of the camera 100 are not synchronized. In the present embodiment, the synchronization control unit 110 starts Genlock activation.

In step S304, the synchronization control unit 110 determines whether or not Genlock activation is complete. For example, the synchronization control unit 110 can determine that the synchronization signal and operation timings have been synchronized, i.e., that Genlock activation is complete, if the synchronization determination unit 111 determines that the first and second synchronization signals are stably synchronized. If it is determined that Genlock activation is complete, processing advances to step S305. If it is determined that Genlock activation is not complete, the processing in step S304 is repeated. Here, the system control unit 103 may output information indicating that the synchronization signal and operation timings are being synchronized, or that the activation of the Genlock function is in progress. For example, the system control unit 103 may output such information to the controller 120, and the controller 120 can display such information on the display 130.

In step S305, the system control unit 103 starts the output of control information to the outside. The processing in step S305 is performed after the synchronization signal and operation timings have been synchronized. In the present embodiment, the system control unit 103 starts the FreeD protocol processing. For example, the system control unit 103 can output the above-described control information of the camera 100 to the controller 120 via the communication unit 112.

At this time, the controller 120 inputs, to the PC 150, an image and control information output from the camera 100. The PC 150 generates a synthesized image by synthesizing the image output from the camera 100 with a virtual space (CG), and outputs the synthesized image to the display 130.

According to the above-described processing, the synchronization signal and operation timings of the camera 100 are synchronized (Genlock) before control information is output to the outside if an instruction to output control information to the outside is input when the synchronization signal and operation timings are not synchronized. According to such processing, because the plurality of cameras 100 can input control information to the controller 120 in synchronization, a synthesized image can be generated smoothly based on control information of the cameras 100 even if the controller 120 switches between images.

Furthermore, according to such processing, the synchronization signal and operation timings can be synchronized before processing for outputting control information to the outside is performed. Specifically, according to the present embodiment, Genlock is activated before the FreeD protocol processing is started. Thus, a situation in which the output of control information is interrupted as a result of Genlock being activated during the FreeD protocol processing can be suppressed from occurring, and processing for generating a synthesized image can be performed smoothly. Furthermore, in a case in which the FreeD protocol processing is performed, it can be expected that an image generated by the camera 100 will also be output to the controller 120 in addition to control information. Thus, a situation in which image synthesis processing is disturbed (e.g., interruption of image output or image disturbance) as a result of Genlock being activated during the FreeD protocol processing can be suppressed from occurring, and processing for generating a synthesized image can be performed smoothly.

In particular, in the above-described embodiment, the synchronization signal and operation timings of the camera 100 are synchronized if an instruction to output control information to the outside is input when the synchronization signal is being input to the camera 100, and the synchronization signal and operation timings are not synchronized. On the other hand, the synchronization signal and operation timings of the camera 100 need not be synchronized if an instruction to output control information to the outside is input when the synchronization signal is not being input to the camera 100, and the synchronization signal and operation timings are not synchronized. In this case, the output of control information to the outside can be started without synchronizing the synchronization signal and operation timings.

Note that, in the above-described example, the synchronization control unit 110 immediately starts Genlock activation in step S303. In such a manner, in step S303, the synchronization control unit 110 can synchronize the synchronization signal and operation timings of the camera 100 without any instruction to synchronize the synchronization signal and operation timings. On the other hand, in step S303, the system control unit 103 can output, to the outside, an inquiry as to whether or not the synchronization signal and operation timings of the image-capturing apparatus are to be synchronized. For example, before Genlock activation is started in step S303, the system control unit 103 may display, on the display 130, a message asking for confirmation as to whether or not Genlock activation is to be started. In this case, the synchronization control unit 110 can synchronize the synchronization signal and operation timings in accordance with the response to the inquiry. For example, the synchronization control unit 110 may start Genlock activation after a Genlock activation start instruction is input from the user.

Figure 4:
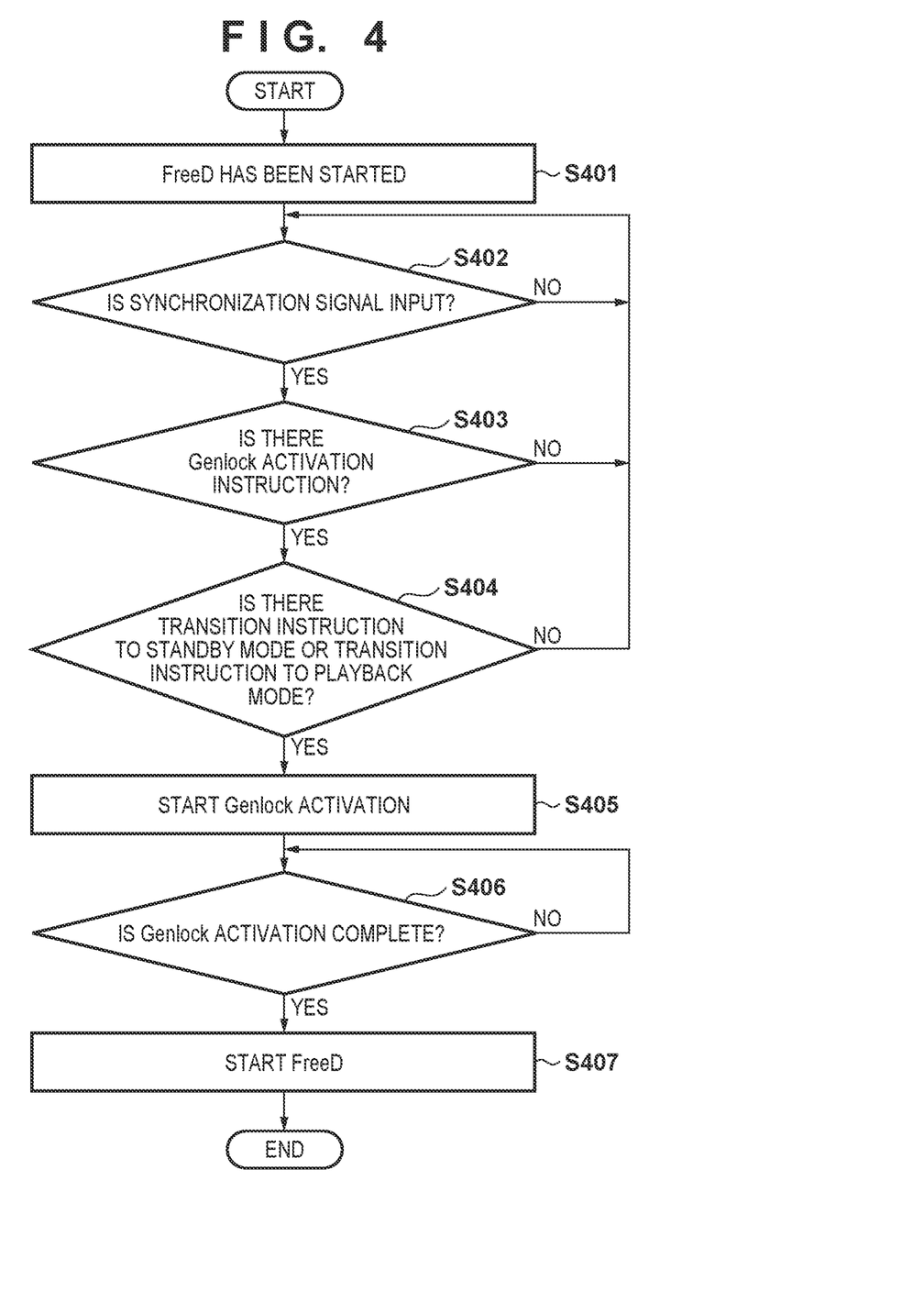
FIG. 4 is a flowchart of a control method executed by the image-capturing apparatus pertaining to one embodiment.

Next, a flow of another control method executed by the image-capturing apparatus pertaining to the present embodiment will be described with reference to the flowchart illustrated in FIG. 4. In the following example, before the flowchart illustrated in FIG. 4 is started, the synchronization signal from the synchronization apparatus 140 and operation timings of the image-capturing apparatus are not synchronized, or in other words, Genlock is deactivated. Furthermore, the system control unit 103 is already outputting control information to the outside before the flowchart illustrated in FIG. 4 is started. In this example, in step S401, the FreeD protocol processing has already been started.

Step S402 is similar to the processing in step S302. If it is determined that the synchronization signal is being input, processing advances to step S403. If it is determined that the synchronization signal is not being input, the processing in step S402 is repeated.

In step S403, the synchronization control unit 110 determines whether or not an instruction to synchronize the synchronization signal and operation timings of the camera 100 has been input. For example, the synchronization control unit 110 can determine whether or not an instruction to activate Genlock has been accepted from the controller 120. If it is determined that an instruction to activate Genlock has been accepted, processing advances to step S404. If it is not determined that an instruction to activate Genlock has been accepted, processing returns to step S402.

In step S404, the system control unit 103 determines whether or not the camera 100 is in the standby mode or the playback mode. As described above, the camera 100 can transition to the standby mode or the playback mode in accordance with an instruction from the controller 120. The camera 100 stops the output of control information to the outside upon transitioning to the standby mode or the playback mode. Thus, it can be said that an instruction to transition to the standby mode or the playback mode is an instruction to stop the output of control information to the outside. If it is determined that the camera 100 is in the standby mode or the playback mode, processing advances to step S405. If it is determined that the camera 100 is not in the standby mode or the playback mode, processing returns to step S402.

Steps S405 and S406 are similar to the processing in steps S303 and S304. If it is determined in step S406 that Genlock activation is complete, processing advances to step S407. If it is determined that Genlock activation is not complete, the processing in step S406 is repeated.

Step S407 is similar to the processing in step S305. As described above, the synchronizing of the synchronization signal and operation timings in steps S405 and S406 is performed after the system control unit 103 stops the output of control information to the outside in step S404 and before the system control unit 103 resumes the output of control information to the outside in step S407

According to the above-described processing, if an instruction to synchronize the synchronization signal and operation timings of the image-capturing apparatus is input while control information is being output to the outside, the synchronization signal and operation timings are synchronized after the output of control information to the outside is stopped. In the present embodiment, if the synchronization signal is input and an instruction to activate Genlock is provided after the FreeD protocol processing is started, Genlock activation is not started immediately and is started after the transition to the standby mode or the playback mode is complete. In such a manner, the synchronization control unit 110 can wait for the system control unit 103 to stop the output of control information to the outside in response to an instruction to stop the output of control information to the outside. Then, the synchronization control unit 110 can synchronize the synchronization signal and operation timings after the system control unit 103 stops the output of control information to the outside. Thus, a situation in which the output of control information is interrupted as a result of Genlock being activated during the FreeD protocol processing can be suppressed from occurring, and processing for generating a synthesized image can be performed smoothly. Furthermore, a situation in which interruption of image output or image disturbance occurs as a result of Genlock being activated during the FreeD protocol processing can thus be suppressed, and processing for generating a synthesized image can be performed smoothly.

Note that, in the above-described example, Genlock activation is started after the camera 100 has transitioned to the standby mode or the playback mode. However, the synchronization signal and operation timings of the image-capturing apparatus may be synchronized at a different timing when the output of control information to the outside stops. For example, Genlock activation may be started at a timing when the FreeD protocol processing is stopped, such as when the system frequency is switched. Furthermore, Genlock activation may be forcibly started in response to a user operation. Furthermore, in another embodiment, if an instruction to synchronize the synchronization signal and operation timings of the image-capturing apparatus is input while control information is being output to the outside, the synchronization control unit 110 may refrain from synchronizing the synchronization signal and operation timings of the camera 100.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-079710, filed May 13, 2022, which is hereby incorporated by reference herein in its entirety.

What is claimed is:

1. An image-capturing apparatus comprising:
   an imaging sensor;
   a controller configured to control operation timings of the image-capturing apparatus; and
   a communication interface configured to output an image captured by the image-capturing apparatus and control information of the image-capturing apparatus to the outside at timings controlled by the controller,
   wherein the controller can control the operation timings of the image-capturing apparatus in accordance with a synchronization signal input to the image-capturing apparatus, and
   the controller synchronizes the synchronization signal and the operation timings of the image-capturing apparatus before the control information is output to the outside, when an instruction to output the control information to the outside is input while the synchronization signal and the operation timings are not synchronized.

2. The image-capturing apparatus according to claim 1, wherein the communication interface is further configured to start the output of the control information to the outside after the synchronization signal and the operation timings have been synchronized.

3. The image-capturing apparatus according to claim 1, wherein the controller is further configured to synchronize the synchronization signal and the operation timings of the image-capturing apparatus before the control information is output to the outside, when the instruction to output the control information to the outside is input while (i) the synchronization signal is being input to the image-capturing apparatus and (ii) the synchronization signal and the operation timings are not synchronized.

4. The image-capturing apparatus according to claim 1, wherein the controller is further configured to synchronize the synchronization signal and the operation timings of the image-capturing apparatus without any instruction to synchronize the synchronization signal and the operation timings of the image-capturing apparatus, when the instruction to output the control information to the outside is input while the synchronization signal and the operation timings are not synchronized.

5. The image-capturing apparatus according to claim 1, wherein the communication interface is further configured to output, to the outside, an inquiry as to whether the synchronization signal and the operation timings of the image-capturing apparatus are to be synchronized, when the instruction to output the control information to the outside is input while the synchronization signal and the operation timings of the image-capturing apparatus are not synchronized, and
the controller is further configured to synchronize the synchronization signal and the operation timings in accordance with a response to the inquiry.

6. The image-capturing apparatus according to claim 1, wherein the controller is further configured not to synchronize the synchronization signal and the operation timings of the image-capturing apparatus, when an instruction to synchronize the synchronization signal and the operation timings of the image-capturing apparatus is input while the communication interface is outputting the control information to the outside.

7. The image-capturing apparatus according to claim 1, wherein the controller is further configured to, when an instruction to synchronize the synchronization signal and the operation timings of the image-capturing apparatus is input while the communication interface is outputting the control information to the outside, synchronize the synchronization signal and the operation timings after the communication interface stops the output of the control information to the outside and before the communication interface resumes the output of the control information to the outside.

8. The image-capturing apparatus according to claim 7, wherein the controller is further configured to wait for the communication interface to stop the output of the control information to the outside in response to an instruction to stop the output of the control information to the outside, and synchronize the synchronization signal and the operation timings after the communication interface stops the output of the control information to the outside.

9. The image-capturing apparatus according to claim 1, wherein the controller is further configured to perform Genlock in accordance with the synchronization signal.

10. The image-capturing apparatus according to claim 1, wherein the controller is further configured to perform control for synchronizing the synchronization signal and operations of the image-capturing apparatus.

11. The image-capturing apparatus according to claim 1, wherein the controller is further configured to control the communication interface so that the communication interface outputs the image and the control information to the outside at timings that are synchronized with the synchronization signal.

12. The image-capturing apparatus according to claim 1, wherein the communication interface is further configured to output the control information in accordance with the FreeD protocol.

13. The image-capturing apparatus according to claim 1, wherein the control information includes position information and orientation information of the image-capturing apparatus.

14. The image-capturing apparatus according to claim 1, wherein the instruction to output the control information to the outside is an instruction to start FreeD protocol processing.

15. A control method performed by an image-capturing apparatus comprising an imaging sensor and a controller configured to control operation timings of the image-capturing apparatus, wherein the controller can control the operation timings of the image-capturing apparatus in accordance with a synchronization signal input to the image-capturing apparatus, the method comprising:
synchronizing the synchronization signal and the operation timings of the image-capturing apparatus before control information of the image-capturing apparatus is output to the outside, when an instruction to output the control information to the outside is input while the synchronization signal and the operation timings are not synchronized; and
outputting an image captured by the image-capturing apparatus and the control information of the image0capturing apparatus to the outside at timings controlled by the controller.

16. A non-transitory computer-readable medium storing a program executable by one or more processors of an image capturing apparatus comprising an imaging sensor to perform a method comprising:
controlling operation timings of the image-capturing apparatus;
synchronizing a synchronization signal input to the image-capturing apparatus and the operation timings of the image-capturing apparatus before control information of the image-capturing apparatus is output to the outside, when an instruction to output the control information to the outside is input while the synchronization signal and the operation timings are not synchronized;
controlling the operation timings of the image-capturing apparatus in accordance with the synchronization signal; and
outputting an image captured by the image-capturing apparatus and the control information of the image-capturing apparatus to the outside at the controlled operation timings.

* * * * *